US012718195B2

(12) United States Patent
Jeon et al.

(10) Patent No.: US 12,718,195 B2
(45) Date of Patent: Aug. 25, 2026

(54) DEVICE AND METHOD FOR INVENTORY MANAGEMENT OF LIVESTOCK BASED ON IMAGE

(71) Applicant: INTFLOW INC., Gwangju (KR)

(72) Inventors: Kwang Myung Jeon, Gwangju (KR); Dong Hae Shin, Gwangju (KR); So Heun Ju, Gwangju (KR)

(73) Assignee: INTFLOW INC., Gwangju (KR)

( * ) Notice: Subject to any disclaimer, the term of this patent is extended or adjusted under 35 U.S.C. 154(b) by 163 days.

(21) Appl. No.: 18/485,193

(22) Filed: Oct. 11, 2023

(65) Prior Publication Data

US 2024/0095670 A1 Mar. 21, 2024

Related U.S. Application Data

(63) Continuation of application No. PCT/KR2023/014022, filed on Sep. 18, 2023.

(30) Foreign Application Priority Data

Sep. 16, 2022 (KR) ........................ 10-2022-0117005

(51) Int. Cl.
*G06Q 10/087* (2023.01)
*A01K 29/00* (2006.01)
(Continued)

(52) U.S. Cl.
CPC ......... *G06Q 10/087* (2013.01); *A01K 29/005* (2013.01); *G06V 10/25* (2022.01);
(Continued)

(58) Field of Classification Search
CPC ...... G06Q 10/087; G06Q 10/06; G06Q 10/08; A01K 29/005; G06V 10/25; G06V 10/70;
(Continued)

(56) References Cited

U.S. PATENT DOCUMENTS 5,474,085 A * 12/1995 Hurnik ................... G01N 33/12
600/587
9,084,411 B1 * 7/2015 McGlone ............. A01K 11/006
(Continued)

FOREIGN PATENT DOCUMENTS

JP H0935036 A 2/1997
JP 2017194760 A 10/2017
(Continued)

OTHER PUBLICATIONS

European Search Report—European Application No. 23787001.9 issued on Mar. 14, 2025, citing US 2020/0120900 and US 2022/0104463.

*Primary Examiner* — Michael Jared Walker
(74) *Attorney, Agent, or Firm* — CANTOR COLBURN LLP

(57) ABSTRACT

An image-based livestock inventory management device includes a data transmission and reception module, a memory storing an image-based livestock inventory management program, and a processor configured to execute the image-based livestock inventory management program stored in the memory, wherein the image-based livestock inventory management program detects each livestock individual by inputting, to a livestock individual detection model, an image collected by at least one camera that captures a doorway of each livestock room which is set as one region of interest (ROI), tracks a movement state of each livestock individual by accumulating and storing center coordinates of detected each livestock individual, generates entry and exit state information of each livestock room by counting an entry action and an exit action of each livestock individual at the doorway of each livestock room for the ROI, and provides inventory information.

6 Claims, 7 Drawing Sheets

(51) Int. Cl.

| | |
|---|---|
| ***G06V 10/25*** | (2022.01) |
| ***G06V 10/70*** | (2022.01) |
| ***G06V 40/10*** | (2022.01) |
| ***G06V 40/20*** | (2022.01) |

(52) U.S. Cl.
CPC .............. *G06V 10/70* (2022.01); *G06V 40/10* (2022.01); *G06V 40/20* (2022.01)

(58) Field of Classification Search
CPC ........ G06V 40/10; G06V 40/20; G06V 20/52; G06T 7/11; G06T 7/13; G06T 7/292; H04N 7/18
See application file for complete search history.

(56) References Cited

U.S. PATENT DOCUMENTS

| | | | | |
|---|---|---|---|---|
| 11,080,522 | B2 * | 8/2021 | Borchersen | G06T 7/62 |
| 11,178,852 | B2 * | 11/2021 | Labrecque | A01K 5/02 |
| 12,022,805 | B2 * | 7/2024 | Spears | G01S 17/89 |
| 2005/0257748 | A1 * | 11/2005 | Kriesel | A22B 5/007 119/51.02 |
| 2020/0120900 | A1 * | 4/2020 | Labrecque | G06T 7/0008 |
| 2020/0258134 | A1 * | 8/2020 | Chung | G06Q 30/0609 |
| 2020/0296935 | A1 * | 9/2020 | Ashek | A01K 29/005 |
| 2021/0315186 | A1 * | 10/2021 | Azimi-Sadjadi | G10L 25/51 |
| 2022/0104463 | A1 * | 4/2022 | Spears | G06V 20/46 |
| 2022/0198209 | A1 * | 6/2022 | Spears | G06V 10/454 |
| 2023/0079388 | A1 * | 3/2023 | Fisher | G06T 3/60 382/103 |

FOREIGN PATENT DOCUMENTS

| | | | |
|---|---|---|---|
| KR | 20130082528 | A | 7/2013 |
| KR | 101595764 | B1 | 2/2016 |
| KR | 20160044835 | A | 4/2016 |
| KR | 102101977 | B1 | 5/2020 |
| KR | 102264281 | B1 | 6/2021 |
| KR | 20220053272 | A | 4/2022 |
| KR | 20220068711 | A | 5/2022 |

* cited by examiner

Figure 5:
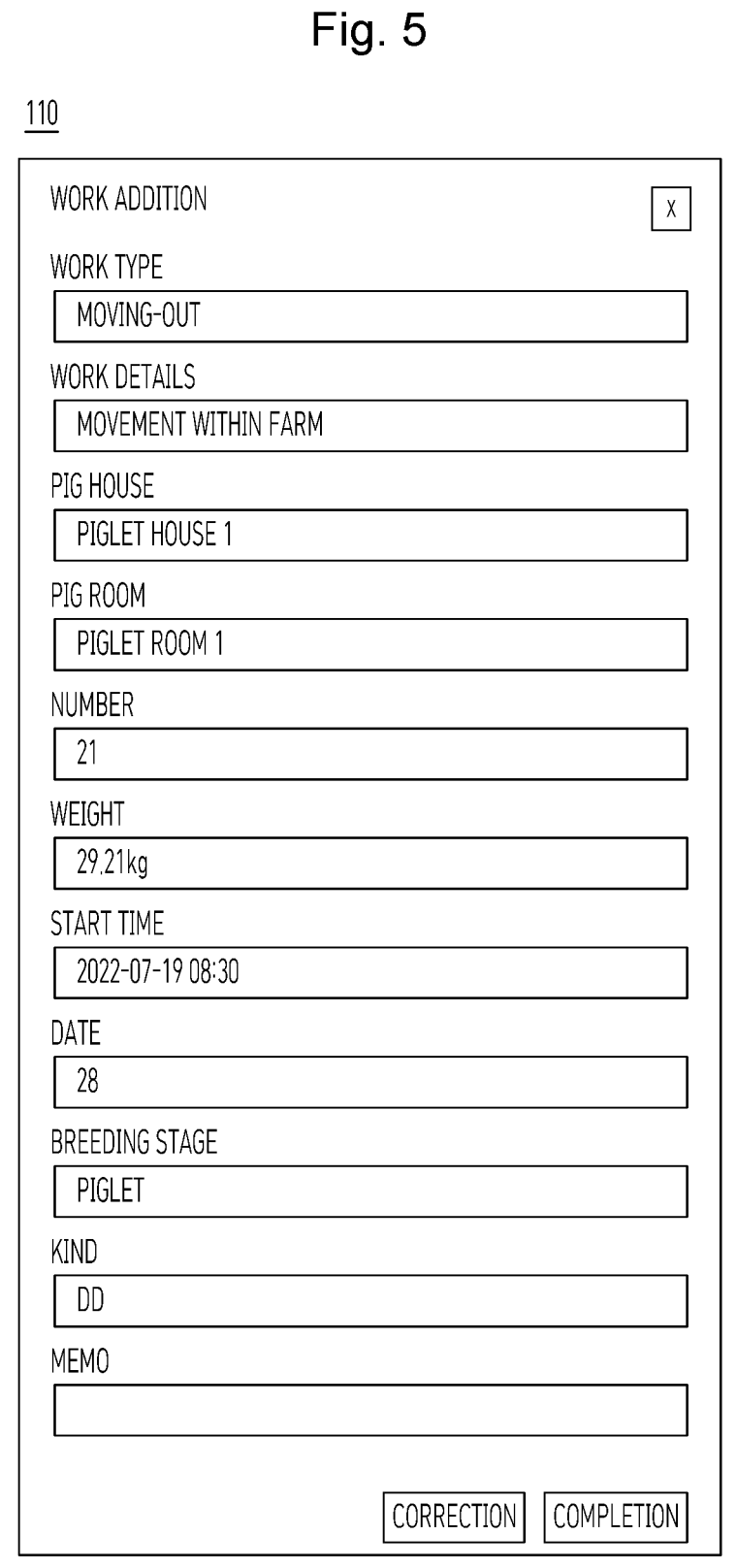

WORK ADDITION

X

WORK TYPE

MOVING-OUT

WORK DETAILS

MOVEMENT WITHIN FARM

PIG HOUSE

PIGLET HOUSE 1

PIG ROOM

PIGLET ROOM 1

NUMBER

21

WEIGHT 29.21kg

START TIME 2022-07-19 08:30

DATE

28

BREEDING STAGE

PIGLET

KIND

DD

MEMO

CORRECTION

COMPLETION

Figure 6:
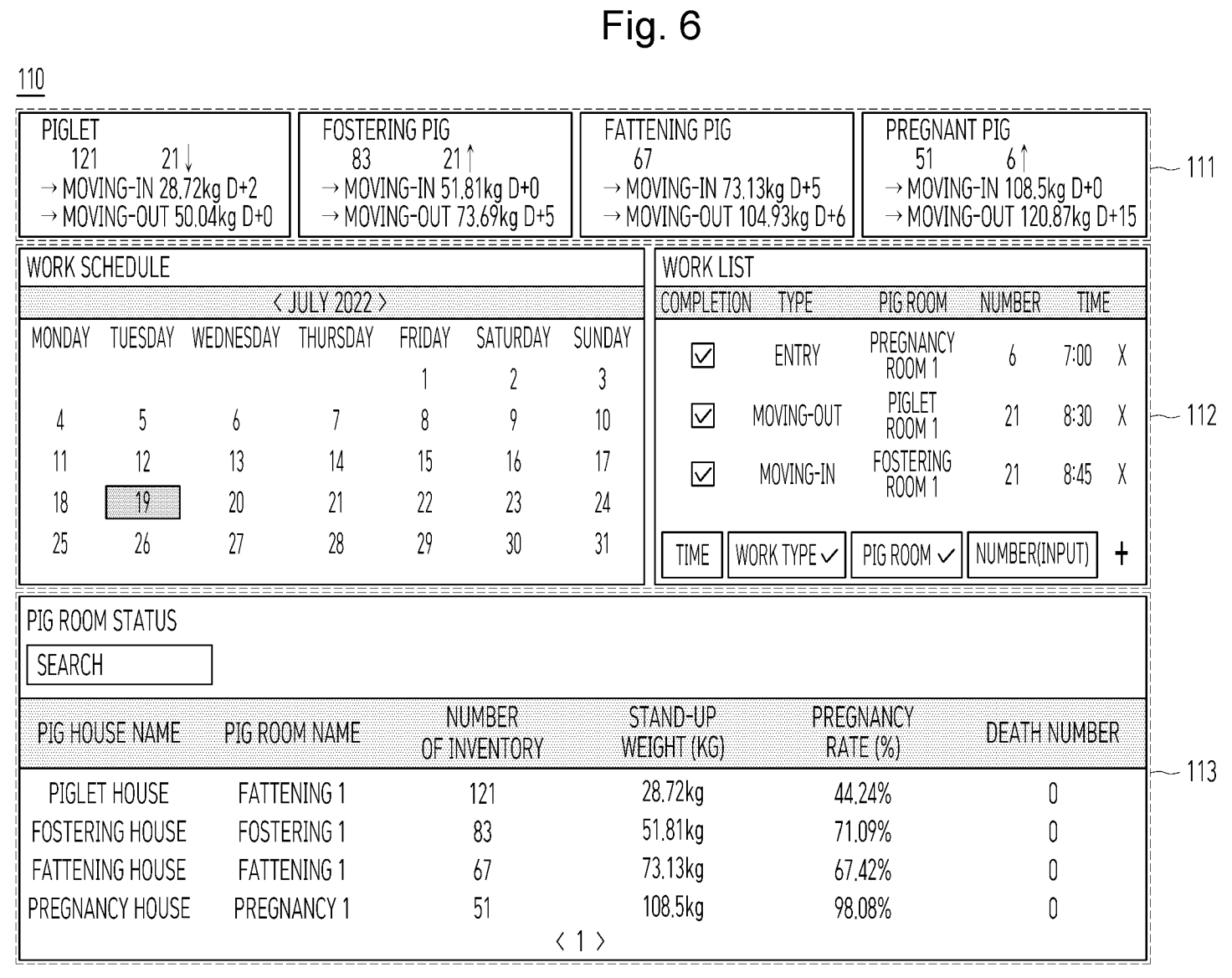

PIGLET
121 21↓
→ MOVING-IN 28.72kg D+2
→ MOVING-OUT 50.04kg D+0

FOSTERING PIG
83 21↑
→ MOVING-IN 51.81kg D+0
→ MOVING-OUT 73.69kg D+5

FATTENING PIG
67
→ MOVING-IN 73.13kg D+5
→ MOVING-OUT 104.93kg D+6

PREGNANT PIG
51 6↑
→ MOVING-IN 108.5kg D+0
→ MOVING-OUT 120.87kg D+15

111

WORK SCHEDULE

〈 JULY 2022 〉

| MONDAY | TUESDAY | WEDNESDAY | THURSDAY | FRIDAY | SATURDAY | SUNDAY |
|---|---|---|---|---|---|---|
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

WORK LIST

| COMPLETION | TYPE | PIG ROOM | NUMBER | TIME | |
|---|---|---|---|---|---|
| ☑ | ENTRY | PREGNANCY ROOM 1 | 6 | 7:00 | X |
| ☑ | MOVING-OUT | PIGLET ROOM 1 | 21 | 8:30 | X |
| ☑ | MOVING-IN | FOSTERING ROOM 1 | 21 | 8:45 | X |

TIME | WORK TYPE ✓ | PIG ROOM ✓ | NUMBER(INPUT) | +

112

PIG ROOM STATUS

SEARCH

| PIG HOUSE NAME | PIG ROOM NAME | NUMBER OF INVENTORY | STAND-UP WEIGHT (KG) | PREGNANCY RATE (%) | DEATH NUMBER |
|---|---|---|---|---|---|
| PIGLET HOUSE | FATTENING 1 | 121 | 28.72kg | 44.24% | 0 |
| FOSTERING HOUSE | FOSTERING 1 | 83 | 51.81kg | 71.09% | 0 |
| FATTENING HOUSE | FATTENING 1 | 67 | 73.13kg | 67.42% | 0 |
| PREGNANCY HOUSE | PREGNANCY 1 | 51 | 108.5kg | 98.08% | 0 |

〈 1 〉

113

DEVICE AND METHOD FOR INVENTORY MANAGEMENT OF LIVESTOCK BASED ON IMAGE

BACKGROUND

The present disclosure relates to an image-based livestock inventory management device and an image-based livestock inventory management method.

In general, the number of livestock raised in livestock farms frequently increases or decreases due to reasons, such as entry, moving-in, moving-out, giving birth, or dying. Errors may occur in a total counting due to various reasons, such as delays or omissions in reporting. Such individual number management is very important basic information for calculating input costs, such as animal feed, manpower, and facility, in a livestock farm and establishing a breeding and shipping plan. In addition, with the growth of global economy, the livestock industry has increased in breeding scale and decreased in manpower, and accordingly, it is difficult to measure and manage the number of inventories through human observation.

In this regard, as the known livestock management method, Korean Patent No. 10-2101977 (title of invention: METHOD FOR OPERATING SMART LIVESTOCK INTEGRATED MANAGEMENT PLATFORM) includes a step of collecting livestock raw data including one or more of feed information for each livestock house, individual state information, and environment/facility information through a sensor node, a step of transmitting the collected livestock raw data to an analysis server, in which a smart livestock integrated management platform is stored, based on a low-power wide area communication network, and a step of generating monitoring information obtained by analyzing the livestock raw data through the smart livestock integrated management platform.

However, the raw data of the known invention is assumed to be collected through a sensor node including a feed level sensor, an object sensor, and a livestock house sensor, which means that sensors such as BLE, LORA, and RFID have to be attached to each livestock, and this is applied to most livestock such as beef cattle, pig, and chicken, which have a large inventory, but has an disadvantage of being difficult to spread due to low economic feasibility.

SUMMARY

The present disclosure provides an image-based livestock inventory management device and an image-based livestock inventory management method that automatically checks the number of livestock animals in stock in a livestock farm and obtains inventory information on the entire farm by using the number of livestock animals.

Technical objects to be achieved by the present embodiments are not limited to the above technical object, and there may be other technical objects.

According to an aspect of the present disclosure, an image-based livestock inventory management device includes a data transmission and reception module, a memory storing an image-based livestock inventory management program, and a processor configured to execute the image-based livestock inventory management program stored in the memory, wherein the image-based livestock inventory management program detects each livestock individual by inputting, to a livestock individual detection model, an image collected by at least one camera that captures a doorway of each livestock room which is set as one region of interest (ROI), tracks a movement state of each livestock individual by accumulating and storing center coordinates of detected each livestock individual, generates entry and exit state information of each livestock room by counting an entry action and an exit action of each livestock individual at the doorway of each livestock room for the ROI, and provides inventory information including the number of real-time livestock individuals for each livestock room based on an initial value of the number of livestock individuals housed in each livestock room and the entry and exit state information.

According to another aspect of the present disclosure, a livestock inventory management method using an image-based livestock inventory management device includes detecting each livestock individual by inputting, to a livestock individual detection model, an image collected by at least one camera that captures an image of a doorway of each livestock room set as one region of interest (ROI), tracking a movement state of each livestock individual by accumulating and storing center coordinates of detected each livestock individual, generating entry and exit state information of each livestock room by counting an entry action and an exit action of each livestock individual at the doorway of each livestock room for the ROI, and providing inventory information including a real-time number of livestock individuals for each livestock room based on an initial value of the number of livestock individuals housed in each livestock room and the entry and exit state information.

According to one of the above-described components for solving the problem of the present disclosure, unlike the known method that requires sensors to be individually attached to a livestock body or a nearby device, even when breeding density in a farm increases, the total inventory number of livestock animals may be checked simply by installing a camera in a breeding region.

In particular, because no physical device comes into contact with a surface or an interior of the animal, inventory management may be made without causing harm to animals. That is, the present disclosure may be especially useful for inventory management of livestock animals with a large number of management individuals, such as pig and chicken.

In addition, because the amount of necessary animal feeds may be exactly predicted through real-time inventory state information, a fixed amount may be paid without waste or shortage of the animal feed, and accordingly, waste of feed may be reduced and profitability compared to input costs may be increased.

Also, the number of dead animals in the field may be checked in real time, and thus, problems of the field including spread of infectious livestock diseases may be recognized in a timely manner and countermeasures may be taken at the golden time.

BRIEF DESCRIPTION OF THE DRAWINGS

Embodiments will be more clearly understood from the following detailed description taken in conjunction with the accompanying drawings in which:

FIGS. 5 and 6 are diagrams illustrating a user interface according to an embodiment of the present disclosure.

DETAILED DESCRIPTION OF THE EMBODIMENTS

Figure 1:
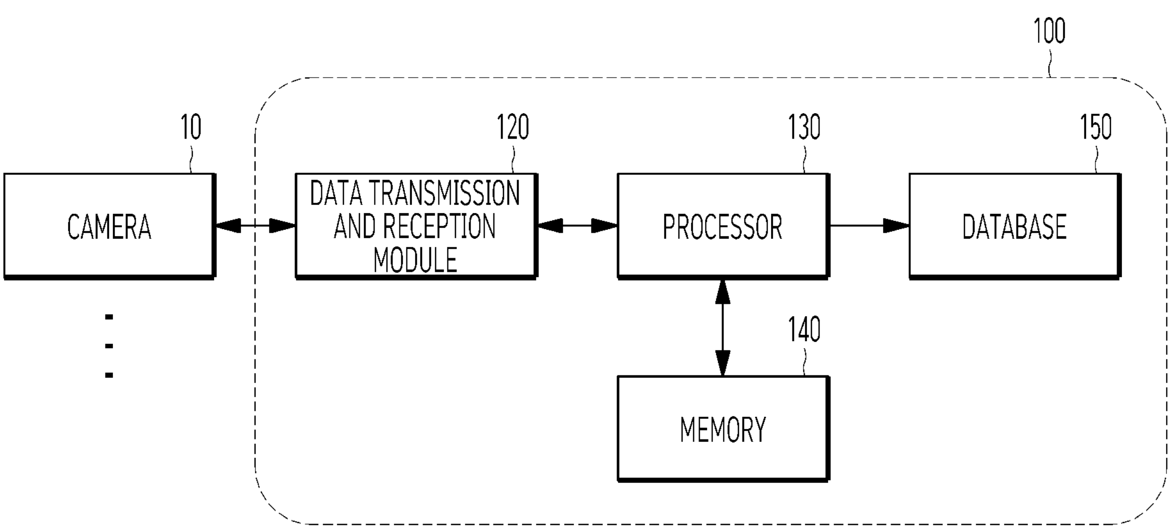
FIG. 1 is a block diagram illustrating a configuration of an image-based livestock inventory management device according to an embodiment of the present disclosure.

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

When it is described that a portion is “connected” to another portion throughout the specification, this includes not only a case where the portion is “directly connected” to another portion but also a case where the portion is “indirectly connected” to another portion with another component therebetween.

When it is described that a member is “on” another member throughout the specification, this includes not only a case where a member is in contact with another member, but also a case where there is another member between the two members.

Hereinafter, an embodiment of the present disclosure will be described in detail with reference to the attached drawings.

FIG. 1 is a block diagram illustrating a configuration of an image-based livestock inventory management device according to an embodiment of the present disclosure.

Referring to FIG. 1, an image-based livestock inventory management device 100 may include a plurality of cameras 10, a data transmission and reception module 120, a processor 130, a memory 140, and a database 150.

The data transmission and reception module 120 may receive an image obtained by capturing, by one of the plurality of cameras 10, a doorway 20 of each livestock room which is set as one region of interest (ROI) and transmit the image to the processor 130.

The data transmission and reception module 120 may include hardware and software required to transmit and receive signals, such as control signals or data signals, through wired or wireless connections with a network device.

The processor 130 may execute a program stored in the memory 140 and perform the following processing according to the execution of an image-based livestock inventory management program.

The program may detect each livestock individual by inputting, to the livestock individual detection model, images collected by at least one of the plurality of cameras 10 that each capture the doorway 20 of each livestock room which is set as one ROI, track a movement state of each livestock individual by accumulating and storing center coordinates of detected each livestock individual, generate entry and exit state information of each livestock room by counting an entry action and an exit action of each livestock individual at a doorway of each livestock room for each ROI, and provide inventory information including the number of real-time livestock individuals for each livestock room based on an initial value of the number of livestock individuals housed in each livestock room and entry and exit state information.

In the present disclosure, a doorway of a livestock room where groups of animals at similar breeding stages are usually raised is set as a breeding management point for inventory management of livestock individuals, referred to as ROI, but is not limited thereto, and may be a moving-in/moving-out corridor or a shipping stand. This may be set in various ways depending on species of animals raised on a farm, a breeding size, a facility structure, a breeding method, and so on.

The processor 130 may include all types of devices capable of processing data. For example, the processor 130 may refer to a data processing device that includes a physically structured circuit to perform a function expressed by codes or instructions included in a program and is built in hardware. The data processing device built in hardware may include, for example, a microprocessor, a central processing unit (CPU), a processor core, a multiprocessor, an application-specific integrated circuit (ASIC), a field programmable gate array (FPGA), or so on, but the scope of the present disclosure is not limited thereto.

The memory 140 may store an image-based livestock inventory management program. The memory 140 may store an operating system for driving the image-based livestock inventory management device 100 or various types of data generated during execution of the image-based livestock inventory management program.

In this case, the memory 140 refers to a non-volatile storage device that continuously maintains stored information even when power is not supplied, and a volatile storage device that requires power to maintain the stored information.

Also, the memory 140 may perform a function of temporarily or permanently storing data processed by the processor 130. Here, the memory 140 may include magnetic storage media or flash storage media in addition to a volatile storage device that requires power to maintain stored information, but the scope of the present disclosure is not limited thereto.

The database 150 stores or provides data necessary for the image-based livestock inventory management device 100 under control by the processor 130. In one example, the database 150 may cumulatively store object detection data of a livestock individual detected by inputting images collected by the camera 10 to a livestock individual detection model, a movement state, and entry and exit state information. The database 150 may be included as a separate component from the memory 140 or may be built in a partial region of the memory 140.

Hereinafter, a detailed process for livestock inventory management for each livestock room will be described with reference to FIGS. 2 to 6.

Figure 2:
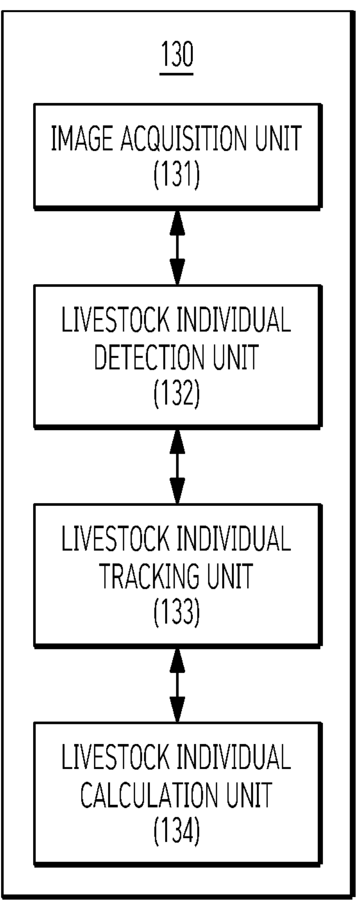
FIG. 2 is a block diagram illustrating detailed components of an image-based livestock inventory management device according to an embodiment of the present disclosure.
Figure 3:
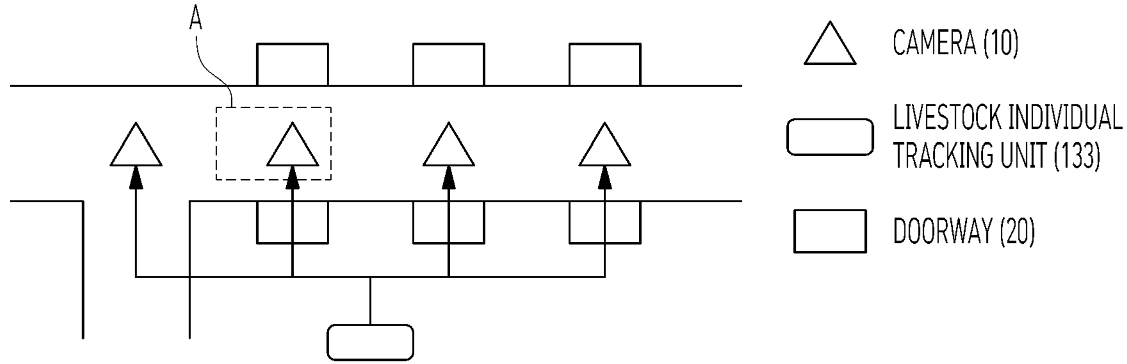
FIG. 3 is a view schematically illustrating a plane of a livestock house where a region of interest (ROI) for a doorway of each livestock room is set and a plurality of cameras are installed, according to an embodiment of the present disclosure.

FIG. 2 is a block diagram illustrating detailed components of an image-based livestock inventory management device according to an embodiment of the present disclosure, and FIG. 3 is a view schematically illustrating a plane of a livestock house where an ROI for a doorway of each livestock room is set and a plurality of cameras are installed, according to an embodiment of the present disclosure As illustrated in FIG. 2, the processor 130 may perform various functions depending on the execution of a program, and may include detailed modules consisting of an image acquisition unit 131, a livestock individual detection unit 132, a livestock individual tracking unit 133, and a livestock individual calculation unit 134 according to each function.

The image acquisition unit 131 may detect each livestock individual by inputting, to a livestock individual detection model, images collected by at least one of the plurality of cameras 10 that captures images of the doorway 20 of each livestock room which is set as one ROI.

In one example, referring to FIG. 3, the plurality of cameras 10 may each capture an image of the doorway 20, which is set as one ROI, of each livestock room provided in a livestock house, and at least one of the cameras 10 may be placed in a movement path in which the doorways 20 of a plurality of livestock rooms may be monitored. Also, the plurality of cameras 10 may each transmit an image captured at a preset angle of view within a search region to the data transmission and reception module 120.

The livestock individual detection unit 132 may detect each livestock individual by inputting the images collected by the plurality of cameras 10 to the livestock individual detection model.

In one example, a deep learning-based livestock individual detection model for customized training for each livestock species may be used to drive the livestock individual detection unit 132. For example, both the known individual detection model, such as CNN, YoLo, RetinaNet, SDD, and RCNN, and an individual detection model, which includes changed neural networks and loss functions to increase accuracy for each livestock species, may be used.

Here, unlike ordinary objects, livestock continuously move and exhibit various action patterns. Accordingly, the livestock individual detection model may include a component that estimates a direction that a livestock body faces in order to consistently measure a body surface size and a component that prevents a size measurement error due to an action of livestock.

Hereinafter, the livestock individual detection model will be described in detail.

Figure 4A:
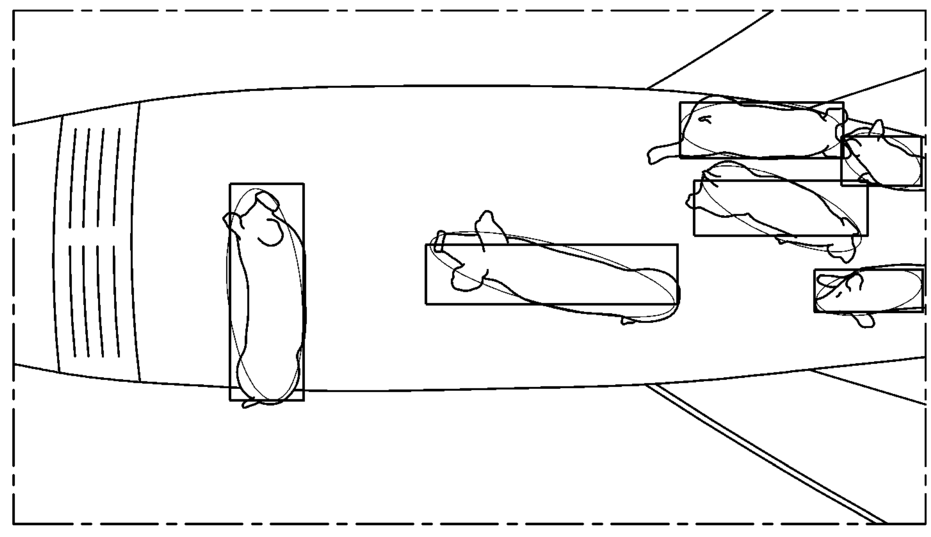
FIGS. 4A and 4B are views illustrating a livestock individual detection model of an image-based livestock inventory management device, according to an embodiment of the present disclosure.
Figure 4B:
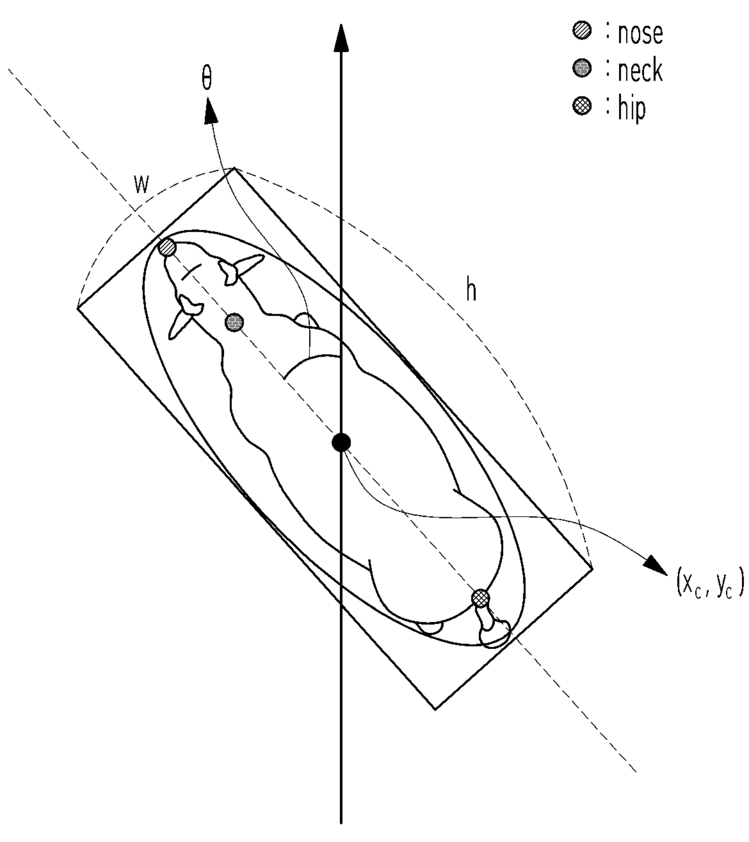

FIGS. 4A and 4B are views illustrating a livestock individual detection model of an image-based livestock inventory management device according to an embodiment of the present disclosure, where FIG. 4A is an image corresponding to A illustrated in FIG. 3.

Referring to FIGS. 4A and 4B, the livestock individual detection model is a model learned by using an outline adjacent to a body region of each livestock individual included in an input image and using training data in which state information is labelled for each type of livestock individuals, and may detect each livestock individual from the input image, and may output the state information of the detected livestock individual.

In one example, the outline of the livestock individual detection model may be set to a square or an oval. In one example, as illustrated in FIG. 4B, the outline of the training data of the livestock individual detection model may be set to a square indicating a boundary box of the livestock individual or an oval defined by a center point, a length of a major axis, and a length of a minor axis.

In one example, object detection data is information on an outline formed to fit a body area of a livestock individual detected for each livestock species in the image of an ROI collected by the camera 10, and may include coordinates xc and yc of a center point of an outline, a width w of a bounding box, a length of an outline h, and an angle θ at which the outline is rotated with respect to a reference axis. Also, object detection data is position information (coordinates) indicating keypoints of livestock individuals and includes a position of an end of the head of the livestock individual (nose), ae position of the neck (neck), a position of an end of the body (hip), and so on. For example, when a long axis of an oval is in a direction of 12 o'clock, the long axis is a reference axis (0 degrees), and by rotating counterclockwise about the reference axis, a direction toward which the neck (nose and neck) of a livestock individual faces becomes a rotation axis, and accordingly, the rotated angle θ may be designated.

Also, the object detection data may additionally include information on the type (class) of an animal individual detected in the image. The information on the type of livestock individual includes different species of animals, such as pigs, cows, goats, sheep, and horses, but is not limited thereto. For example, even within the same species, types may be distinguished by growth stage. pigs may be classified into lactating piglets, weaning pigs, fostering pigs, fattening pigs, candidate pigs, pregnant pigs, and farrowing pigs.

The livestock individual detection unit 132 may detect state information for each livestock individual by inputting the images collected by the camera 10 to the livestock individual detection model.

In another example, the livestock individual detection model may learn death information including an image of a dead livestock individual (carcass) being moved as the state information of the livestock individual. For example, the death information includes scenes of movement of dead bodies that may be distinguished from the input image, such as a scene where a dead body is dragged by people and a scene where a dead body is moved in a cart.

In one example, the state information may be classified as an entry and exit state of a livestock individual including death, entry, exit, and so on, but is not limited thereto.

That is, the livestock individual calculation unit 134 to be described below may calculate, by using the death information, death history including the number and death rate of dead livestock individuals occurring in each livestock room.

Meanwhile, in addition to the model structure described above, it is also possible to propose and train a new structure for the purpose of state information of livestock individuals and object detection of the present disclosure. However, a reference action for detecting state information distinguished by livestock individual detection may be set differently depending on a reference for measuring a size for each livestock species.

Referring again to FIG. 2, the livestock individual tracking unit 133 may track a movement state of each livestock individual by accumulating and storing center coordinates of detected each livestock individual, assign an identification number (ID) to each livestock individual, and track each livestock individual by using the degree that the center coordinates of each identified livestock individual are adjacent to each other.

For example, the livestock individual tracking unit 133 may track the degree of overlap between regions of livestock individuals detected in each frame by a Kalman filter by using the known object tracking algorithm, such as a simple online and real-time tracking algorithm (SORT) based on a Hungarian algorithm, Deep SORT, and correlation-based tracking, and may determine whether a detection result between both frames is the same object.

In order to determine an entry and exit state of each livestock individual, a program may track an entry and exit action of each livestock individual by using time when the center coordinates of each identified livestock object passes coordinates of an ROI and a path including a movement state.

Also, the program may generate entry and exit state information of each livestock room by counting entry and exit actions of each livestock individual at a doorway of each livestock room in each ROI.

Referring again to FIG. 2, when cumulative center coordinates of each livestock individual based on coordinates of the ROI correspond to a path to enter a livestock room, the livestock individual calculation unit 134 may calculate the entry and exit state information as number increase information, and when the cumulative center coordinates correspond to a path to exit from the livestock room, the livestock individual calculation unit 134 may calculate the entry and exit state information as number reduction information.

For example, when the center coordinates of the livestock individual correspond to the path to enter the livestock room after passing through a doorway (outer coordinates) included in each ROI, the entry and exit state information is counted as entry into the livestock room, and when the center coordinates of the livestock individual correspond to a path to exit from the livestock room to the doorway, the entry and exit state information may be counted as an exit of the livestock room.

That is, based on an initial value of the number of livestock individuals housed in each livestock room, the program may collect the entry and exit state information of each livestock room or the state information of each livestock individual and provide inventory information including the real-time number of livestock individuals for each livestock room through a user interface.

For example, the inventory information may include the real-time number of livestock individuals in each livestock room, livestock movement history including time information on an entry action or an exit action, and death history.

FIGS. 5 and 6 are diagrams illustrating a user interface according to an embodiment of the present disclosure.

For example, referring to FIG. 5, a user interface 110 includes an input interface for inputting initial values of the number of livestock individuals housed in each livestock room.

For example, the input interface may include a region for inputting information, such as types of work divided into moving-in, moving-out, and joining, job details, dentification information of each farm (for example, piglet house number 1), identification information of each livestock room (for example, piglet room number 1), number of livestock individuals, a weight, work start time, a schedule (date), a breeding stage (for example, piglet), kind, and so on.

Referring to FIG. 6, the user interface 110 may include a first region 111 that provides the real-time number of livestock individuals for each livestock room, a second region 112 that provides a work schedule calendar including a moving-in or moving-out schedule (movement history) for each livestock room and a work list, and a third region 113 that provides death history including the number of deaths of livestock individuals for each livestock room.

Therefore, the present disclosure may analyze the inventory information of livestock individuals accumulated in a database for each branch of multiple farms or for each livestock room and may provide the inventory number of farms or livestock rooms, a movement history, and a death rate through the user interface 110.

Hereinafter, descriptions of the same configuration among the configurations illustrated in FIGS. 1 to 6 described above are omitted.

Figure 7:
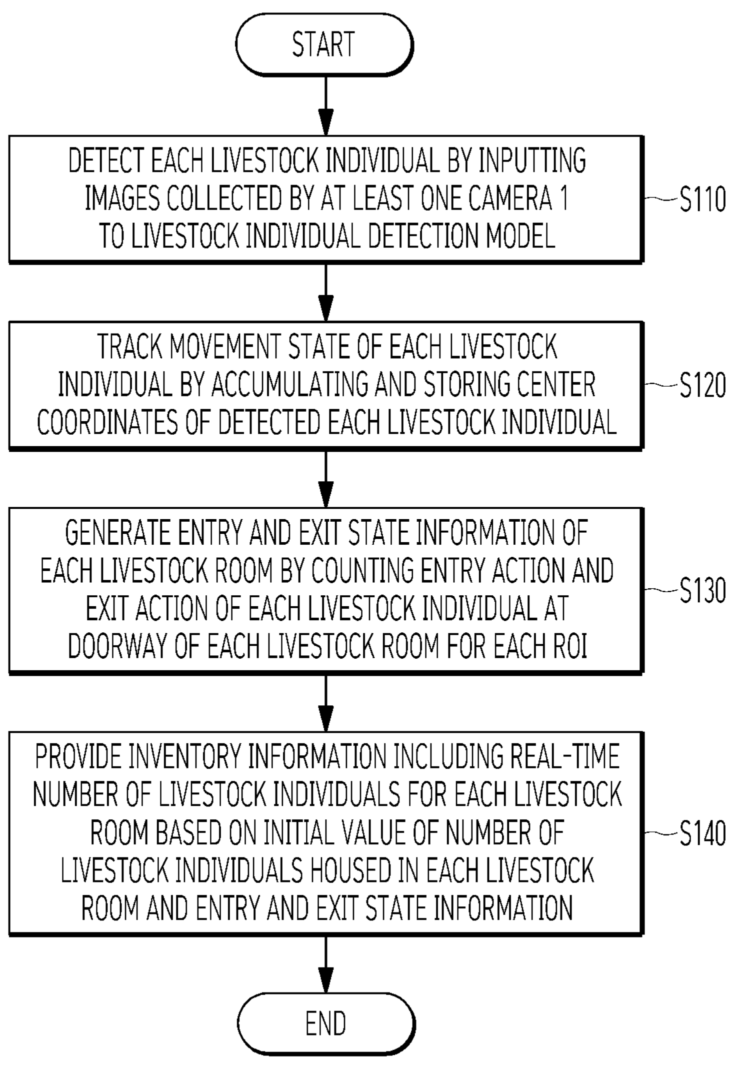
FIG. 7 is a flowchart illustrating an image-based livestock inventory management method according to an embodiment of the present disclosure.

FIG. 7 is a flowchart illustrating an image-based livestock inventory management method according to an embodiment of the present disclosure.

A livestock inventory management method using an image-based livestock inventory management device includes step S110 of detecting each livestock individual by inputting, to a livestock individual detection model, images collected by at least one camera 10 that captures an image of the doorway 20 of each livestock room set as one ROI, step S120 of tracking a movement state of each livestock individual by accumulating and storing center coordinates of detected each livestock individual, step S130 of generating entry and exit state information of each livestock room by counting an entry action and an exit action of each livestock individual at the doorway 20 of each livestock room for each ROI, and step S140 of providing inventory information including the real-time number of livestock individuals for each livestock room based on an initial value of the number of livestock individuals housed in each livestock room and the entry and exit state information.

Before step S110, the livestock inventory management method of the present disclosure may provide the user interface 110 that inputs an initial value of the number of livestock individuals housed in each livestock room.

Also, the user interface 110 may provide inventory information, and the inventory information may include the real-time number of livestock individuals in each livestock room, livestock movement history including time information on an entry action or an exit action, and death history.

The livestock individual detection model is a model learned by using an outline adjacent to a body region of each livestock individual included in an input image and using training data in which state information is labelled for each type of livestock individuals, and may detect each livestock individual from the input image, and may output the state information of the detected livestock individual.

In step S140, when center coordinates of each livestock individual based on center coordinates of the ROI correspond to a path to enter the livestock room, the entry and exit state information may be calculated as number increase information, and when the center coordinates of each livestock individual correspond to a path to exit from the livestock room, the entry and exit state information may be calculated as number reduction information.

One embodiment of the present disclosure may be implemented in the form of a recording medium including instructions executable by a computer, such as a program module executed by a computer. A computer readable medium may be any available medium that may be accessed by a computer and includes both volatile and nonvolatile media, removable and non-removable media. Also, the computer readable medium may include a computer storage medium. A computer storage medium includes both volatile and nonvolatile media and removable and non-removable media implemented by any method or technology for storing information, such as computer readable instructions, data structures, program modules or other data.

Although the method and systems of the present disclosure are described with reference to specific embodiments, some or all of their components or operations may be implemented by using a computer system having a general-purpose hardware architecture.

The above description of the present disclosure is for illustrative purposes, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and likewise, components described as distributed may be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

What is claimed is:

1. An image-based livestock inventory management device comprising:

a data transmission and reception module;

a memory storing an image-based livestock inventory management program; and a processor configured to execute the image-based livestock inventory management program stored in the memory, wherein the image-based livestock inventory management program:

detects each livestock individual by inputting, to a livestock individual detection model, an image collected by at least one camera that captures a doorway of each livestock room of a livestock house, wherein the doorway of each livestock room is set as one region of interest (ROI), detects, by the livestock individual detection model based on an input image, an outline adjacent to a body region of each livestock individual, extracts, by the livestock individual detection model, object detection data comprising a center point of the outline, a width of the outline, a length of the outline, a rotation angle of the outline, and keypoints of each livestock individual based on the detected outline, wherein the keypoints comprise a nose, a neck, and a hip, estimates, by the livestock individual detection model based on the object detection data, a direction that a livestock body of each livestock individual faces;

measures, by the livestock individual detection model based on the object detection data and the estimated direction of the livestock individual, a body surface size of each livestock individual;

determines, by the livestock individual detection model based on the object detection data, the estimated direction of the livestock individual, and the body surface size, a type and a growth stage associated with each livestock individual;

tracks a movement state of each livestock individual by accumulating and storing the center point of the detected outline of each livestock individual based on the object detection data, wherein tracking the movement state is further based on the estimated direction of each livestock individual, generates entry and exit state information of each livestock room by counting, based on the tracked movement state of each livestock individual, an entry action and an exit action of each livestock individual at the doorway of each livestock room for the ROI, and provides inventory information including the number of real-time livestock individuals for each livestock room, respective types of the real-time livestock individuals for each livestock room, and respective growth stages of the real-time livestock individuals for each livestock room, based on an initial value of the number of livestock individuals housed in each livestock room and the entry and exit state information, wherein, the livestock individual detection model:

is a model learned by using the outline adjacent to a body region of each livestock individual included in the input image and training data in which:

the object detection data, comprising the center point of the outline, the width and length of the outline, the rotation angle at which the outline with respect to a reference axis, and the keypoints of the livestock individual is labeled for each type of livestock individuals, and the growth stage of the livestock individual is labeled for each type of livestock individual, detects each livestock individual from the input image, and outputs the object detection data of the detected livestock individual, and wherein, when the center point of the outline of each livestock individual based on coordinates of the ROI corresponds to a path to enter a livestock room, the image-based livestock inventory management program calculates the entry and exit state information as number increase information, and when the center point of the outline corresponds to a path to exit from the livestock room, the image-based livestock inventory management program calculates the entry and exit state information as number reduction information.

2. The image-based livestock inventory management device of claim 1, wherein:

the image-based livestock inventory management program provides a user interface that inputs the initial value of the number of livestock individuals housed in each livestock room.

3. The image-based livestock inventory management device of claim 2, wherein;

the user interface provides the inventory information, which includes a real-time number of livestock individuals in each livestock room, livestock movement history including time information on the entry action or the exit action, and death history.

4. A livestock inventory management method using an image-based livestock inventory management device, the livestock inventory management method comprising:

detecting each livestock individual by inputting, to a livestock individual detection model, an image collected by at least one camera that captures an image of a doorway of each livestock room of a livestock house, wherein the doorway of each livestock room is set as one region of interest (ROI);

detecting, by the livestock individual detection model based on an input image, an outline adjacent to a body region of each livestock individual;

extracting, by the livestock individual detection model, object detection data comprising a center point of the outline, a width of the outline, a length of the outline, a rotation angle of the outline, and keypoints of each livestock individual based on the detected outline, wherein the keypoints comprise one or more of a nose, a neck, and a hip;

estimating, by the livestock individual detection model based on the object detection data, a direction that a livestock body of each livestock individual faces;

measuring, by the livestock individual detection model based on the object detection data and the estimated direction of the livestock individual, a body surface size of each livestock individual;

determining, by the livestock individual detection model based on the object detection data, the estimated direction of the livestock individual, and the body surface size, a type and a growth stage associated with each livestock individual;

tracking a movement state of each livestock individual by accumulating and storing the center point of the detected outline of each livestock individual based on the object detection data, wherein tracking the movement state is further based on the estimated direction of each livestock individual;

generating entry and exit state information of each livestock room by counting, based on the tracked movement state of each livestock individual, an entry action and an exit action of each livestock individual at the doorway of each livestock room for the ROI; and providing inventory information including a real-time number of livestock individuals for each livestock room, respective types of the real-time livestock individuals for each livestock room, and respective growth stages of the real-time livestock individuals for each livestock room, based on an initial value of the number of livestock individuals housed in each livestock room and the entry and exit state information, wherein, the livestock individual detection model:

is a model learned by using the outline adjacent to a body region of each livestock individual included in the input image and training data in which:

the object detection data, comprising the center point of the outline, the width and length of the outline, the rotation angle at which the outline with respect to a reference axis, and the keypoints of the livestock individual is labeled for each type of livestock individuals, and the growth stage of the livestock individual is labeled for each type of livestock individual, detects each livestock individual from the input image, and outputs the object detection data of the detected livestock individual, and wherein, when the center point of the outline of each livestock individual based on coordinates of the ROI corresponds to a path to enter a livestock room, the image-based livestock inventory management program calculates the entry and exit state information as number increase information, and when the center point of the outline corresponds to a path to exit from the livestock room, the image-based livestock inventory management program calculates the entry and exit state information as number reduction information.

5. The livestock inventory management method of claim 4, wherein:

before the detecting of each livestock individual, a user interface that inputs the initial value of the number of livestock individuals housed in each livestock room is provided.

6. The livestock inventory management method of claim 5, wherein:

the user interface provides the inventory information, which includes a real-time number of livestock individuals in each livestock room, livestock movement history including time information on the entry action or the exit action, and death history.

* * * * *